(12) United States Patent
Inaba (10) Patent No.: US 6,494,580 B2
(45) Date of Patent: *Dec. 17, 2002

(54) STEREO SLIDE MOUNT (76) Inventor: Minoru Inaba, No. 1116, Oaza Samukawa, Oyama-shi, Tochigi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/764,582

(22) Filed: Jan. 17, 2001

(65) Prior Publication Data

US 2002/0093630 A1 Jul. 18, 2002

(51) Int. Cl.[7] .................................................. G03B 21/00
(52) U.S. Cl. ........................................... 353/7; 353/120
(58) Field of Search ............................... 353/120, 9, 7, 353/8; 40/701, 704, 705, 706, 707; 359/466, 467, 479, 473, 477

(56) References Cited

U.S. PATENT DOCUMENTS 3,874,787 A * 4/1975 Taylor .......................... 353/108
6,296,360 B1 * 10/2001 Inaba .......................... 353/120
6,350,517 B1 * 2/2002 Wu .............................. 428/352

* cited by examiner

Primary Examiner—Russell Adams
Assistant Examiner—Andrew Sever
(74) Attorney, Agent, or Firm—Fattibene & Fattibene; Paul A. Fattibene; Arthur T. Fattibene (57) ABSTRACT

A stereo slide mount capable of adjusting a pitch between the right and left films, preventing a change in the pitch even when it is caused to fall. A plane land 9 is formed at the central portion of a base frame 3. After having adjusted a pitch between the two film holders 2 mounted on the right and left guide grooves, an adhesive label is stuck onto the land and onto the film holders to secure the film holders. A center window 12 is formed in a cover frame 1, so that the surface of the adhesive label can be viewed by eyes. Shooting data and a caption can be written on the surface of the adhesive label, or a picture of the film may be printed thereon on a reduced scale, or a bar code may be printed thereon and may be utilized for a voice guidance or for controlling a projector.

2 Claims, 8 Drawing Sheets

STEREO SLIDE MOUNT

BACKGROUND OF THE INVENTION

1. Field of the Invention

The present invention relates to a stereo slide mount and, particularly, to a stereo slide mount capable of adjusting a pitch for mounting the films.

2. Prior Art

In mounting films on a stereo slide mount, attention must be given to a pitch for mounting the right and left films as has been known well. That is, a natural perspective feeding is obtained when a stereo image is seen farther than a stereo window (aerial image that appears as one window as the right and left windows of the stereo slide mount are brought into agreement). To do this, a pitch between the right and left films must be so adjusted that the pitch between the same subject on the right and left films becomes wider than a pitch between the right and left windows of the stereo slide mount.

In a stereo camera equipped with a pair of right and left lenses, the pitch between the same subject on the right and left films becomes larger as the distance to the subject becomes short. The image on the films has been inverted upside down and left side right. Therefore, the right and left films are turned by 180 degrees, respectively, and are mounted in a state of an erect image on the stereo slide mount. Here, when the films are mounted without correcting the film-mounting pitch, the pitch between the right and left subjects on the stereo slide mount is rather contracted contrary to that of during the shooting. Therefore, the pitch of the subject image must be corrected by expanding the pitch for mounting the right and left films depending upon the distance to the subject. With the conventional stereo slide mount of a constitution on which the films are pasted, however, it is difficult to finely adjust the positions for mounting the films, and the films are in many cases mounted maintaining inappropriate pitches.

In order to overcome the difficulty of handling inherent in the conventional stereo slide mounts, the present applicant has already proposed a stereo slide mount capable of adjusting the pitch for mounting the right and left films. This stereo slide mount is constituted by a base frame, a pair of right and left film holders capable of being slid toward the right and left relative to the base frame, and a cover frame. Upon mounting the films on the right and left film holders, the stereo slide mount is mounted on a stereo slide viewer, and a proper pitch between the subject images is obtained by adjusting the distance between the right and left film holders while viewing the stereo image.

In the stereo slide mount in which a pair of right and left film holders are allowed to slide toward the right and left relative to the base frame, the pitch of the subject image can be easily adjusted involving, however, such a probability that the film holders slide to change the pitch in case the stereo slide mount is caused to fall or in case a strong shock is applied thereto from the external side. In order to prevent a change in the pitch after the pitch of the subject image has been adjusted, therefore, there arouses a technical problem that must be solved, and it is an object of the present invention to solve this problem.

SUMMARY OF THE INVENTION

The present invention was proposed in order to accomplish the above object, and provides a stereo slide mount comprising a base frame, a cover frame and two film holders each having a window of a size same as the size of the pictures on the films and capable of mounting a frame of film thereon, and having guide grooves formed in the surface of said base frame in the right-and-left direction, said two film holders being engaged with said guide grooves in said base frame so as to adjust a pitch between said two film holders, wherein a piece of adhesive label is stuck onto the edges on the inside of said right and left film holders and onto the central portion of said base frame to secure said right and left film holders, and a center window is formed in said cover frame, so that the surface of said adhesive label can be viewed by eyes through said center window.

BRIEF DESCRIPTION OF THE DRAWINGS

FIG. 1 illustrates a stereo slide mount of the present invention, wherein

FIG. 6 illustrates a collimation pattern mask, wherein

DESCRIPTION OF THE PREFERRED EMBODIMENTS

Figure 1A:
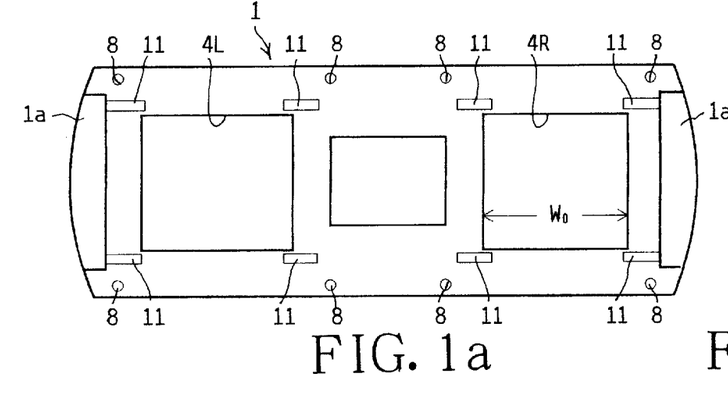
FIG. 1(a) is a back view of a cover frame.

The invention will now be described in detail by way of an embodiment. FIG. 1 illustrates a cover frame 1, two pieces of film holders 2 and a base frame 3 constituting a stereo slide mount, which are all resin injection molded articles, and wherein FIG. 1(a) shows a surface (back surface) of the cover frame 1 that comes in contact with the base frame 3.

Like the conventional stereo slide mount, the cover frame 1 and the base frame 3 are provided with right and left windows 4R, 4L, 5R, 5L for viewing the films. A window 6 is formed in the two pieces of film holders 2 that are sandwiched by the base frame 3 and the cover frame 1.

The windows 4R, 4L, 5R, 5L for viewing the films have a vertical size equal to the vertical size of the picture of the stereo slide film. The windows 4R, 4L of the cover frame 1 have a lateral width W0 slightly smaller than the width of the picture of the film. The lateral width W1 of the window 6 of the film holder 2 is equal to the width of the picture of the film. The lateral width W2 of the windows 5R, 5L of the base frame 3 is equal to, or larger than, the lateral width W0 of the windows 4R, 4L of the cover frame 1. It is desired that the pitch between centers of the right and left windows 4R and 4L of the cover frame 1 is about 63 mm which is nearly equal to the distance between two human eyes.

Figure 1B:
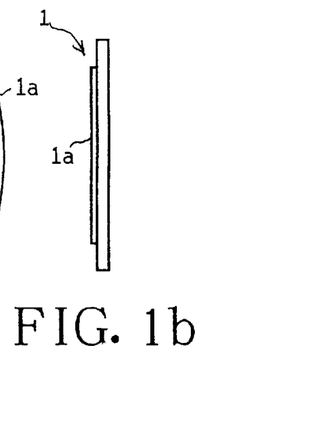
FIG. 1(b) is a side view of the cover frame.
Figure 1C:
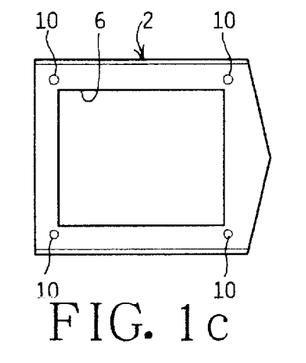
FIGS. 1(c) and 1(d) are front views of film holders.
Figure 1D:
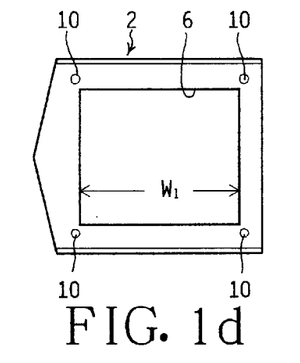
Figure 1E:
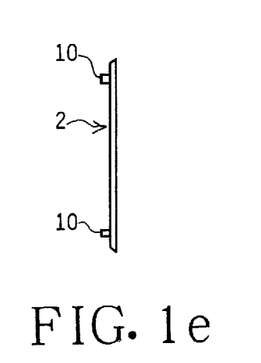
FIG. 1(e) is a side view of the film holders.
Figure 1F:
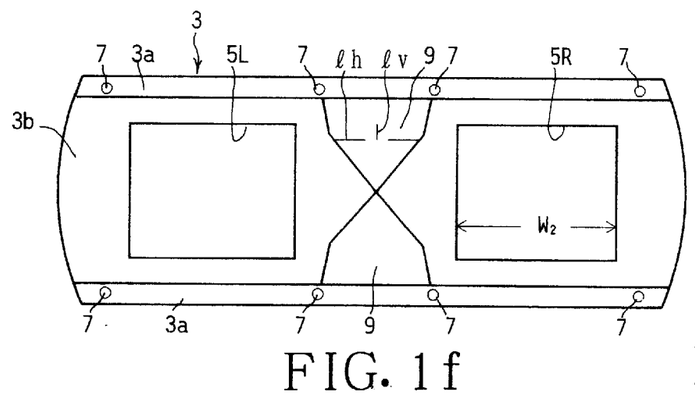
FIG. 1(f) is a front view of a base frame.
Figure 1G:
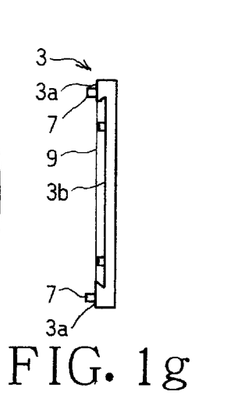
FIG. 1(g) is a side view of the base frame.

Referring to FIGS. 1(f) and 1(g), plural pins 7 are formed on the upper and lower edge portions 3a of the base frame 3, and a pair of right and left dovetail guide grooves 3b are formed in an intermediate portion between the upper side and the lower side thereof. The guide grooves 3b form a slide pair together with the film holders 2 having a trapezoidal shape in cross section as shown in FIG. 1(e); i.e., the film holders 2 engaged in the guide grooves 3b are permitted to slide toward the right and left.

Referring to FIGS. 1(a) and 1(b), the upper and lower edge portions of the cover frame 1 have pin holes 8 formed therein to be fitted with the pins 7 of the base frame 3. The cover frame 1 is placed on the base frame 3 so that the pins 7 are fitted into the pin holes 8. Thus, the base frame 3 and the cover frame 1 are coupled together.

A land 9 that works as a stopper for the film holders 2 is formed at an intermediate portion between the right and left guide grooves 3b of the base frame 3. When the two pieces of film holders 2 are slid to approach each other and are brought into contact with the land 9, a pitch between the windows of the two film holders 2 assumes a maximum value in the minus direction in the range of adjustment. In this case, the pitch between the windows of the film holders 2 is slightly smaller than the pitch between the windows of the cover frame 1.

Referring to FIG. 1(c), the film holder 2 has a pentagonal shape with its vertical sides protruding in a V-shape toward one direction. The two film holders 2 are fitted onto the guide grooves 3b of the base frame 3 with their V-shaped vertical sides being opposed to each other. Two film-positioning pins 10 are formed on the upper side and on the lower side of the window 6 of each film holder 2. Upon bringing the perforations of the films into engagement with the film-positioning pins 10, pictures on the films come in agreement with the windows 6 of the film holder 2.

Helical cams that will be described later of a stereo slide viewer for adjusting the pitch, come in contact with the vertexes of the V-shaped vertical sides of the film holders 2. Therefore, gaps are formed between the land 9 and the vertexes of the V-shaped vertical sides of the film holders 2 in a state where the two pieces of film holders 2 are brought into contact with the land 9.

As for determining the position of the film in the up-and-down direction, the thickness of the film holder 2 is selected to be slightly smaller than the depth of the guide grooves 3b of the base frame, and the upper and lower parts of the film are positioned relying on the upper and lower edge portions 3a of the base frame 3. Or, the vertical width of the film holder is selected to be wider than the one that is diagramed, a shallow horizontal groove is formed maintaining a width equal to the vertical width of the film in the central portion of the film holder in the up-and-down direction, and the upper and lower parts of the film are positioned by the horizontal groove. Or, the positioning is accomplished by forming positioning bosses on the film holder so as to come in contact with the upper and lower sides of the film. Or, any other method may be employed without limitation.

Laterally elongated recesses 11 are formed in the back surface of the cover frame 1 to avoid interference with the film-positioning pins 10 of the film holder 2. The film holder 2 on the base frame 3 can be freely slid toward the right and left over a predetermined range in a state where the cover frame 1 is mounted on the base frame 3.

The center window 12 is formed between the windows 4R and 4L of the cover frame 1 and, hence, the adhesive label that will be described later stuck to the base frame can be seen through the center window 12. The center window 12 may simply be a hole or may be a transparent window fitted with a transparent resin plate or a glass plate to prevent the adhesive label from being fouled. Further, the right and left both ends of the cover frame 1 may be provided with protruded surface portions 1a that enter into the guide grooves 3b of the base frame 3.

Figure 2:
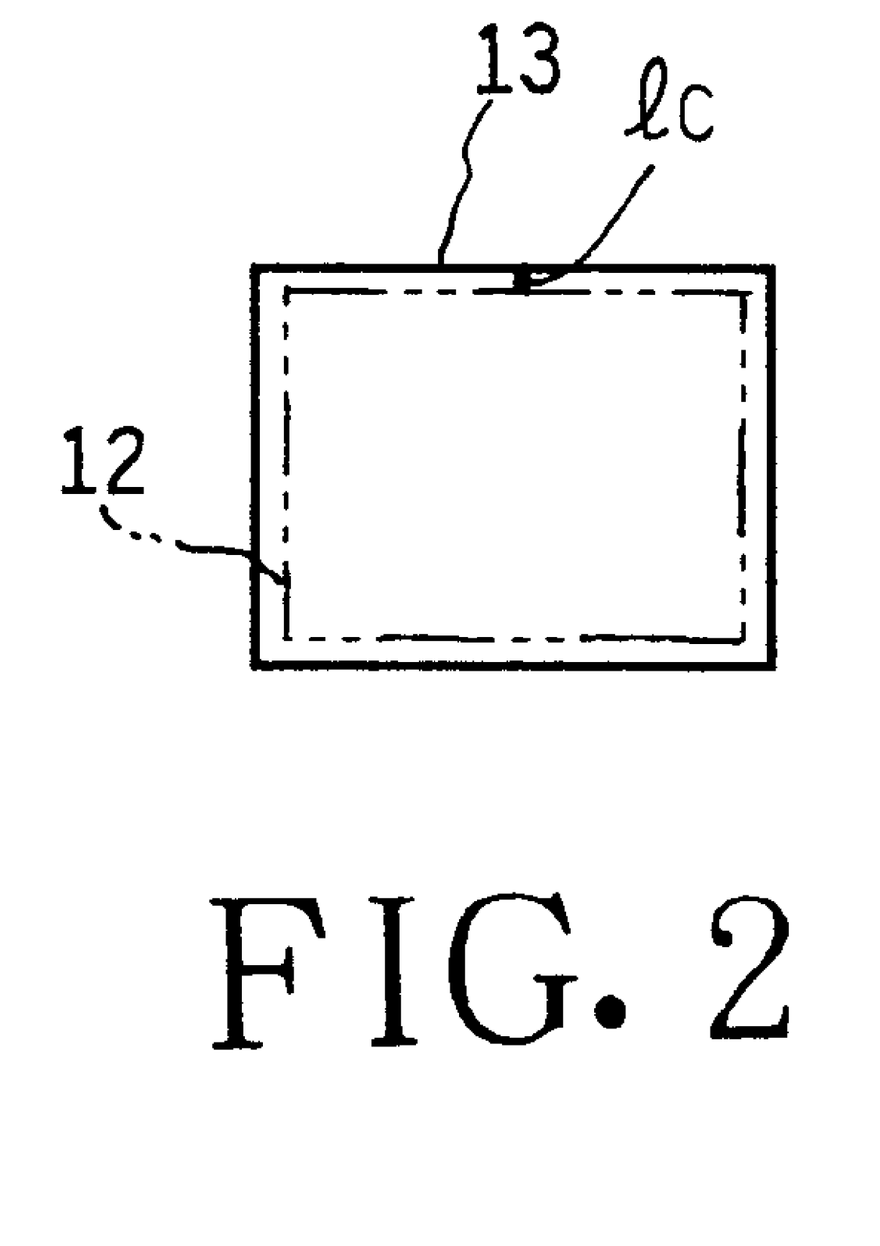
FIG. 2 is a front view of an adhesive label.

FIG. 2 shows the adhesive label 13 to be stuck onto the base frame 3. The adhesive label 13 is slightly larger than the center window 12 of the cover frame 1, and on which the surface can be written or printed characters, and a vertical line 1c is printed at an upper end on the center in the right-and-left direction.

Referring to FIG. 1(f), a horizontal guide line 1h and a vertical guide line 1v are marked on the land 9 of the base frame 3 to indicate a position for sticking the adhesive label 13. Upon bringing the upper end of the adhesive label 13 into agreement with the horizontal guide line 1h and bringing the vertical line 1c of the adhesive label 13 into agreement with the vertical guide line 1v, the adhesive label 13 can be stuck to the central portion of the base frame 3, and the adhesive label 13 and the center window 12 of the cover frame 1 are correctly positioned together.

After the pitch between the two pieces of film holders 2 is properly adjusted, the adhesive label 13 is stuck to the central portion of the base frame 3 to secure the two pieces of film holders 2. Then, the cover frame 1 is mounted to complete the stereo slide mount. Sticking the adhesive label 13 on which the title of the shooting data are written or printed, is convenient for rearranging and selecting the stereo slide mount.

Further, an index-printed adhesive label on which the picture of the right or left film is printed on a reduced scale, enables the user to comprehend the content of the stereo slide mount at a glance. Further, a data code such as bar code may be printed on the adhesive label, and a system may be constituted to execute a variety of controls by using the data code label and a data code reader. For example, the stereo slide viewer and the stereo slide projector may be provided with a data code reader, in order to offer a voice guide, to display characters or picture, or to control the projector relying upon the code that is read out. In this case, the code may be directly converted into voice, or the data such as voice may be stored in advance in the control unit and the data corresponding to the code read from the stereo slide mount may be read out and processed without any limitation on the processing method. Or, the character printing, picture index printing and data code printing may be suitably combined together.

Figure 3:
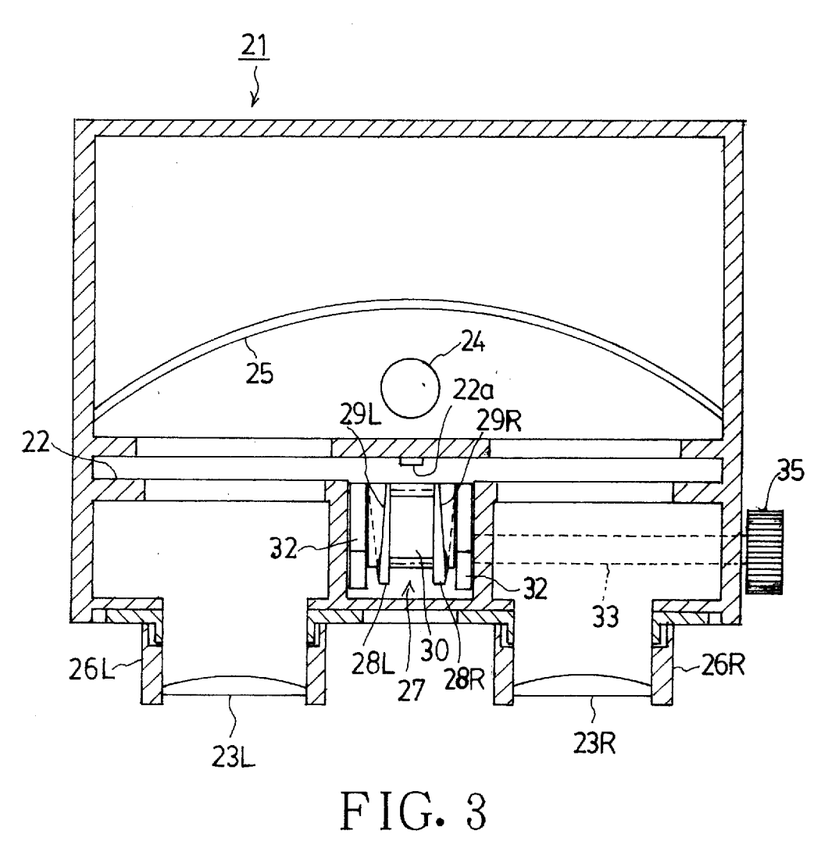
FIG. 3 is a sectional view of a stereo slide viewer according to the present invention.

The stereo slide mount can be easily adjusted for its pitch between the film holders by using a stereo slide viewer which has been proposed already by the present applicant. FIG. 3 illustrates a stereo slide viewer 21. Like in the conventional stereo slide viewer, a pair of right and left eyepieces 23R and 23L are arranged in front of a groove-shaped slide mount holder unit 22, and an illumination lamp 24 and an arcuate reflector 25 are arranged at the back of the slide mount holder unit 22. The lamp 24 is turned on by a cell (not shown) accommodated at the back of the reflector 25, and light is projected onto the back surface of the slide mount holder unit 22 by the reflector 25. Right and left eyepiece lens holders 26R and 26L are so constructed that the distance between the optical axes thereof and the focal points thereof in the direction of the optical axis can be adjusted. A leaf spring 22a is provided on the rear wall surface in the slide mount holder unit 22, and the stereo slide mount in the slide mount holder unit 22 is pressed by the leaf spring 22a onto the wall surface on the side of the eyepieces so as to be positioned.

A film pitch-adjusting device 27 is arranged between the right and left eyepiece optical systems. In the film pitch-adjusting device 27, the helical cams 28R and 28L are turned to adjust the distance between the film holders 2 in the stereo slide mount.

Figure 4:
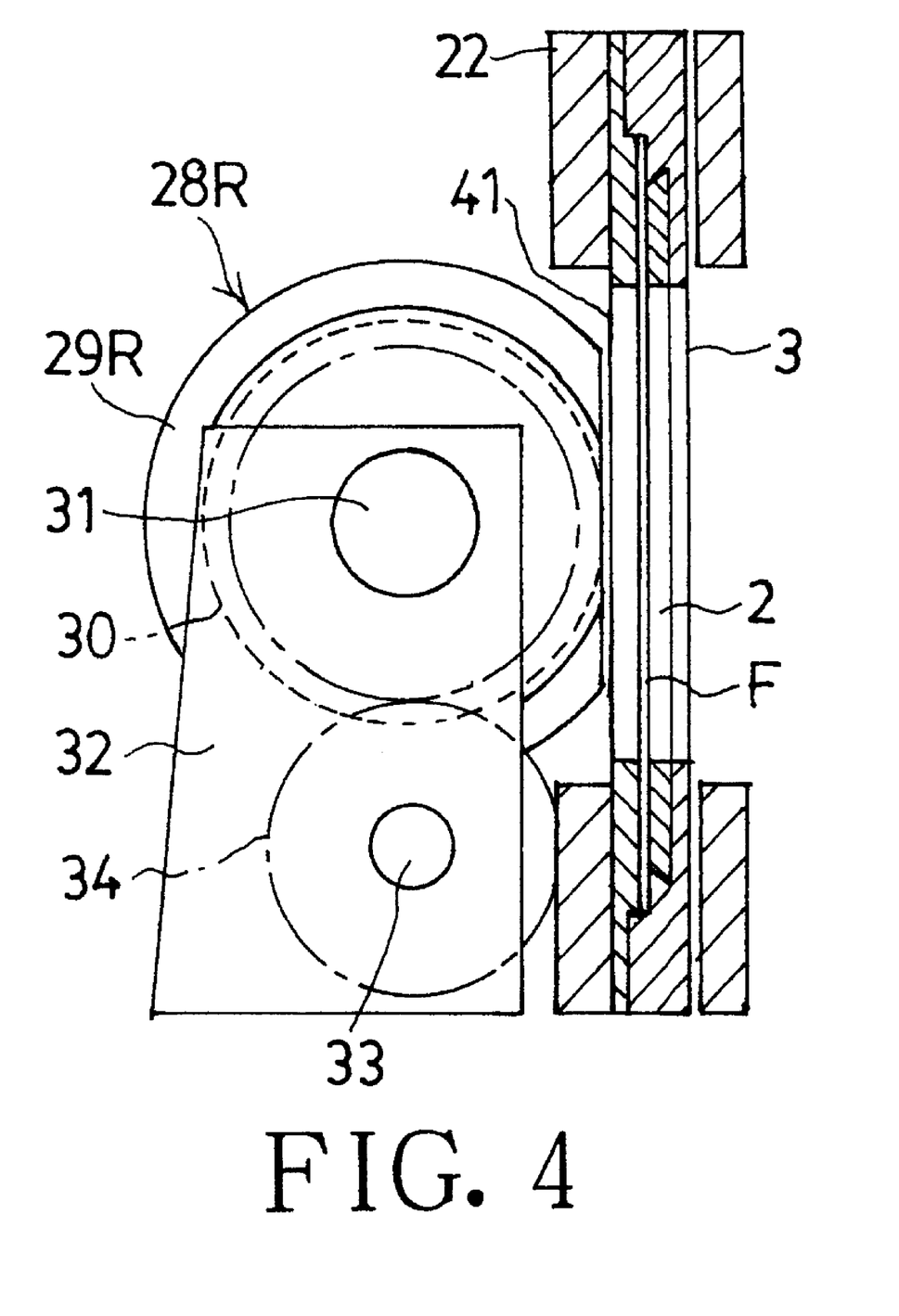
FIG. 4 is a side view of a film pitch-adjusting device in the stereo slide viewer.

Referring to FIG. 4, the pair of right and left helical cams 28R and 28L are of a D-shape in cross section with their outer circumferential surfaces of the disks being cut straight. As shown in FIG. 3, helicoidal cam surfaces 29R, 29L are formed in the outer edge portions of the side surfaces which are on the outer sides, the right cam surface 29R and the left cam surfaces 29L being symmetrical to each other.

The two pieces of helical cams 28R and 28L are fitted to a cam shaft 31 with a spur gear 30 sandwiched therebetween, and the right and left both ends of the cam shaft 31 is supported by bracket bearings 32 provided in a viewer frame. A pinion shaft 33 is arranged under the cam shaft 31 in parallel with the cam shaft 31. A pinion 34 fitted to the pinion shaft 33 is in mesh with the spur gear 30. The helical cams 28R and 28L rotate accompanying the rotation of a knob 35 attached to an end of the pinion shaft 33.

Figure 5:
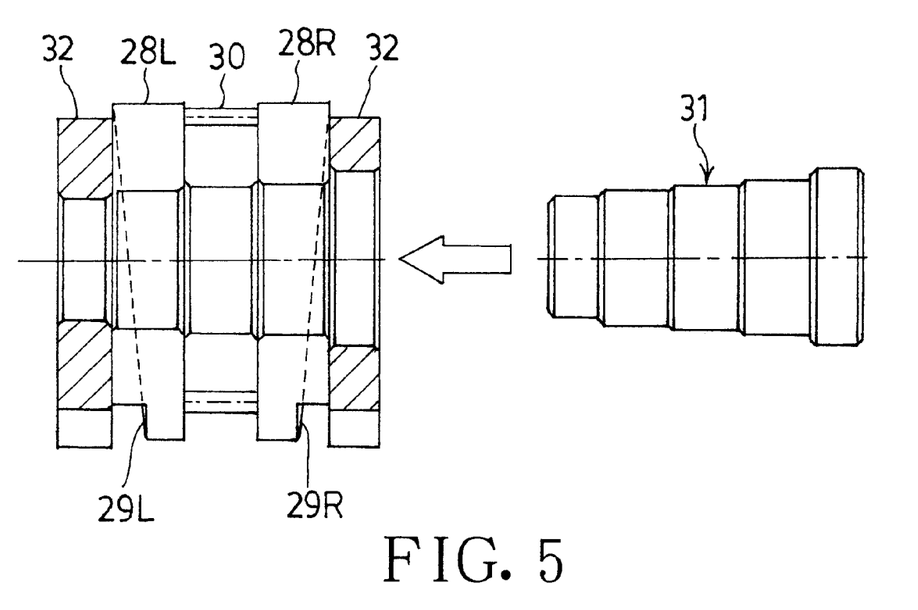
FIG. 5 is a sectional view illustrating a step of assembling the film pitch-adjusting device.

Referring to FIG. 5, the diameters of center holes of the right and left bracket bearings 32, of the two helical cams 28R and 28L and of the spur gear 30, are increasing from the left toward the right in order of left bracket bearing 32, left helical cam 28L, spur gear 30, right helical cam 28R and right bracket bearing 32. The cam shaft 31, too, is formed in a stepped shape to correspond to these diameters.

The film pitch-adjusting device 27 is assembled by setting two pieces of helical cams 28R, 28L and the central spur gear 30 between the right and left bracket bearings 32, and forcibly introducing the cam shaft 31 toward the left from the outer side of the right bracket bearing 32 in a state where the two pieces of helical cams 28R and 28L are in correct phase with each other. Then, the two pieces of helical cams 28R and 28L, the central spur gear 30, and the cam shaft 31 are tightly fitted together, while the cam shaft 31 and the right and left bracket bearings 32 are loosely fitted together. Thus, the two pieces of helical cams 28R and 28L, and the central spur gear 30, are assembled as a unitary structure. The gear for driving the helical cams may be a worm gear or a bevel gear instead of the spur gear 30 that is shown, and there is no particular limitation on it.

Figure 6A:
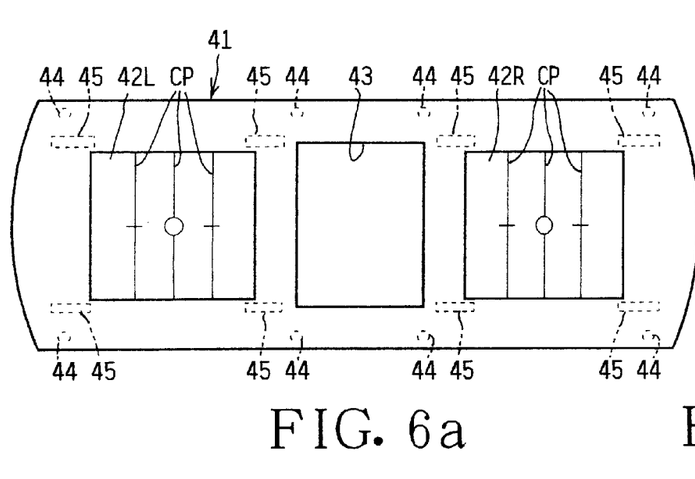
FIG. 6(a) is a front view and FIG. 6(b) is a side sectional view.

FIG. 6 illustrates a collimation pattern mask 41 which makes it easy to recognize an optimum pitch in adjusting the pitch between the films on the stereo slide mount by using the stereo slide viewer 21. The collimation pattern mask 41 has a figure similar to that of the cover frame 1, and the portions other than the right and left transparent windows 42R and 42L are coated with a light-shielding coating material or are formed of a colored resin so will not to transmit light, and has a square window 43 formed in the central portion thereof.

The sizes and positions of the transparent windows 42R, 42L, pin holes 44 and recesses 45 are the same as those of the cover frame 1. The same collimation patterns CP comprising chiefly plural vertical lines are printed on the back surfaces (contacting to the films) of the transparent windows 42R and 42L, and these surfaces have been subjected to the anti-Newton ring treatment.

Figure 6B:
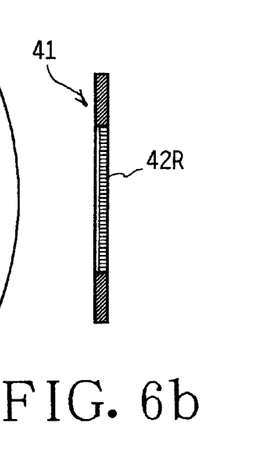

Referring to FIG. 6(b), the surfaces of the transparent windows 42R and 42L are slightly lower than the surrounding thereof so will not come into contact with the wall surface of the slide mount holder unit 22 of the stereo slide viewer, so that the transparent windows 42R and 42L will not be scarred. In order to prevent the surfaces of the film from being scratched at the time of adjusting the pitch between the films, further, it is desired to smoothly finish the back surfaces of the collimation pattern mask 41 by coating it with a material having a small coefficient of friction such as a polymer sold under the trademark TEFLON or polyethylene.

The right and left ends of the stereo slide mount and of the collimation pattern mask 41 are of an arcuate shape, so as to be easily inserted in the slide mount holder unit 22 of the stereo slide viewer. Further, the lateral width of the slide mount holder unit 22 is selected to be the same as the lateral width of the base frame 3 to prevent the stereo slide mount from being deviated in position in the right-and-left direction.

Next, described below is the procedure for mounting the films and the operation for adjusting the pitch between the films.

Figure 7:
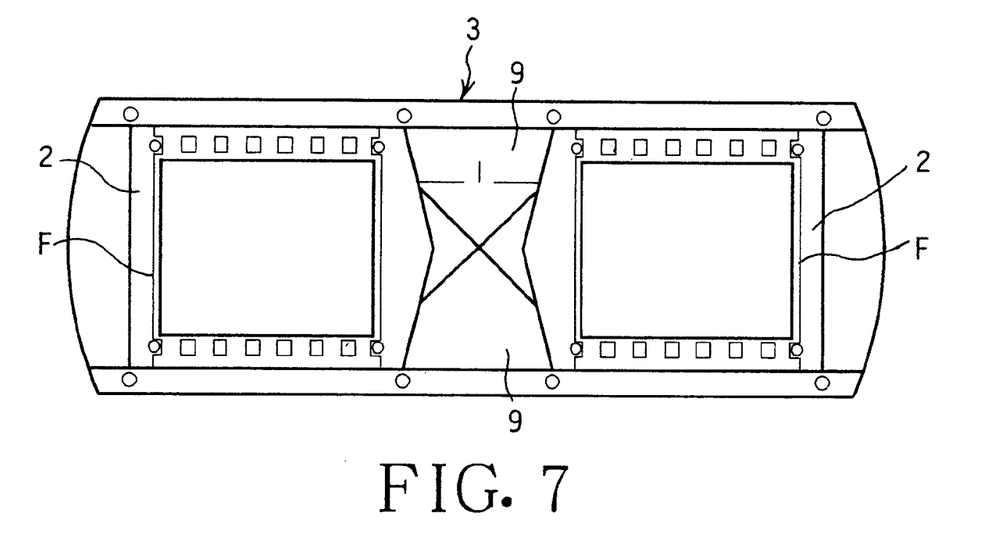
FIG. 7 illustrates a procedure of the operation for adjusting the pitch between the films and is a front view illustrating a state where the film holders and the films are mounted on the base frame.
Figure 8:
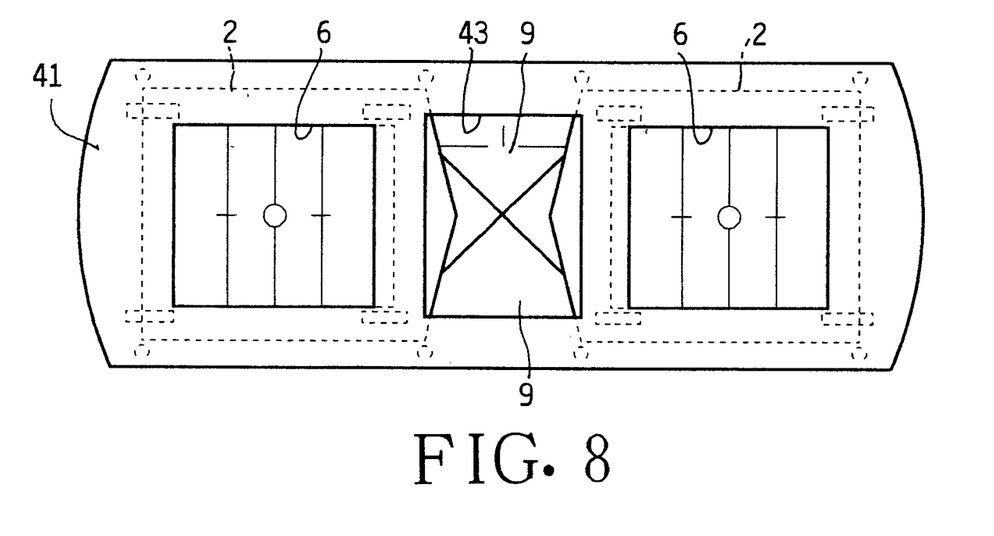
FIG. 8 is a front view illustrating a state where a collimation pattern mask is mounted on the base frame in the state of FIG. 7.

1. Referring to FIG. 7, two pieces of right and left film holders 2 are mounted on the base frame 3, and the films F are mounted on the film holders 2 at positions where the right and left film holders 2 are brought closest to each other. Here, the pitch between the windows of the right and left film holders 2 is slightly narrower than the pitch between the windows of the cover frame 1.
2. The collimation pattern mask 41 is mounted on the base frame 3. Referring to FIG. 8, ends on the inside of the film holders 2 appear to be exposed in the center window 43 of the collimation pattern mask 41.
3. The base frame 3 mounting the collimation pattern mask 41 is inserted in the slide mount holder unit 22 of the stereo slide viewer 21.
4. Perspective feeling of a picture relative to the image of the collimation pattern CP of the collimation pattern mask 41 is observed through the eyepieces 23R and 23L of the stereo slide viewer 21. In a state where the picture is seen on the same plane as the collimation pattern CP or at the back of the collimation pattern CP, a proper pitch is maintained between the films on the stereo slide mount, and the pitch between the films needs not be adjusted. Therefore, the stereo slide mount is removed from the stereo slide viewer 21, the collimation pattern mask 41 is removed from the base frame 3 and, instead, the cover frame 1 is mounted to complete the mounting operation.

In most of the cases, however, the subject in a close range appears in front of the collimation pattern CP. In this case, the pitch between the films must be adjusted.

5. The knob 35 of the stereo slide viewer 21 is turned to adjust the pitch between the films. When the pinion 34 is turned counterclockwise in FIG. 4, the helical cams 28R and 28L turn clockwise from the initial positions in FIG. 4, and the ends of the cam surfaces 29R and 29L enter into between the two pieces of film holders 2. The cam surfaces 29R and 29L come into contact with the vertexes of the vertical sides on the inner sides of the film holders 2, and the distance between the two pieces of film holders 2 increases.

The edges on the outsides of the pictures of the films are masked over increased areas by the edges of the windows of the collimation pattern mask 41, and the stereo image moves away into distance with respect to the image of the collimation pattern CP. An optimum pitch between the films is the one with which the stereo image is seen on the same plane as the collimation pattern CP or is seen at the back of the collimation pattern CP. In this case, the knob 35 is turned reverse to return the helical cams 28R and 28L to their initial positions.

Then, the stereo slide mount is removed from the stereo slide viewer 21, the collimation pattern mask 41 is removed from the base frame 3, the adhesive label 13 is stuck to the center of the base frame to secure the two pieces of film holders 2, and the cover frame 1 is mounted to complete the stereo slide mount maintaining an optimum pitch between the films.

Here, it should be noted that the present invention is in no way limited to the above embodiment only but can be modified in a variety of ways without departing from the technical scope of the invention and that such modifications are encompassed by the present invention, as a matter of course.

According to the stereo slide mount of the present invention as described above, a pair of right and left film holders mounted on the base frame are secured by an adhesive label. Therefore, the pitch between the film holders is prevented from changing even in case the stereo slide mount is caused to fall on the floor or even when a shock is given thereto.

What is claimed is:

1. A stereo slide mount comprising a base frame, a cover frame and two film holders each having a window of a size same as the size of the pictures on the films and capable of mounting a frame of film thereon, and having guide grooves formed in the surface of said base frame in the right-and-left direction, said two film holders being engaged with said guide grooved in said base frame so as to adjust a pitch between said two film holders, wherein a piece of adhesive label is stuck onto the edges on the inside of said right and left film holders and onto the central portion of said base frame to secure said right and left film holders, and a center window is formed in said cover frame, so that the surface of said adhesive label can be viewed by eyes through said center window.

2. A stereo slide mount according to claim 1, wherein the center window in said cover frame is formed by a transparent resin plate or a transparent glass plate.

* * * * *